(12) United States Patent
Olmstead et al.

(10) Patent No.: US 6,429,900 B1
(45) Date of Patent: Aug. 6, 2002

(54) TRANSMISSION OF WIDEBAND CHROMA SIGNALS

(75) Inventors: Neil R. Olmstead, Nevada City; Bret Jones, Grass Valley, both of CA (US)

(73) Assignee: Grass Valley (U.S.) Inc., Nevada City, CA (US)

( * ) Notice: Subject to any disclaimer, the term of this patent is extended or adjusted under 35 U.S.C. 154(b) by 0 days.

(21) Appl. No.: 09/364,371

(22) Filed: Jul. 30, 1999

(51) Int. Cl.[7] .......................... H04N 11/20; H04N 11/02
(52) U.S. Cl. ...................... 348/453; 348/488; 348/489; 348/444; 348/391.1
(58) Field of Search .................... 348/488, 487, 348/489, 444, 453, 441, 552, 708, 391.1, 426.1; 345/604, 603; 382/162, 163, 298, 299; 375/240.26; H04N 11/20, 11/02

(56) References Cited

U.S. PATENT DOCUMENTS

| | | | | |
|---|---|---|---|---|
| 4,748,496 A | * | 5/1988 | Drury et al. ................. | 348/435 |
| 5,583,574 A | * | 12/1996 | Tanaka et al. ............... | 348/434 |
| 5,650,824 A | * | 7/1997 | Huang ......................... | 348/453 |
| 5,654,773 A | * | 8/1997 | Kajimoto et al. ............ | 348/717 |
| 5,712,687 A | * | 1/1998 | Naveen et al. ............... | 348/453 |
| 5,838,394 A | * | 11/1998 | Kajimoto et al. ............ | 348/717 |
| 6,184,936 B1 | * | 2/2001 | Hu ............................... | 348/453 |
| 6,275,263 B1 | * | 8/2001 | Hu ............................... | 348/453 |
| 6,281,938 B1 | * | 8/2001 | Rogers ......................... | 348/555 |
| 6,307,592 B1 | * | 10/2001 | Go ................................ | 348/453 |

* cited by examiner

Primary Examiner—John W. Miller
Assistant Examiner—Jean W. Désir
(74) Attorney, Agent, or Firm—Smith-Hill and Bedell

(57) ABSTRACT

A method of transmission of wide bandwidth chroma signals converts a component video signal having a luminance and two half-bandwidth chroma components into a 0:4:4 video signal having no luminance component and two wide bandwidth chroma components. Half of the wide bandwidth chroma component samples are inserted into a standard serial digital data stream in place of the luminance component, and the second half of the wide bandwidth chroma component samples are inserted into the standard serial digital data stream in place of the two half-bandwidth chroma components.

1 Claim, 3 Drawing Sheets

STANDARD 4:2:2 LUMINANCE / CHROMINANCE MULTIPLEX SCHEME PER SMPTE 125M AND ITU-R-BT.601

PRIOR ART
FIG. 1

TRANSMISSION OF WIDEBAND CHROMA SIGNALS

BACKGROUND OF THE INVENTION

The present invention relates to video signal processing, and more particularly to a method of transmission of wideband chroma signals.

The preferred format for the exchange of standard definition component video signals is described in SMPTE standard RP-259, SMPTE 125M and ITU-R BT.601. These describe the encapsulation of one luminance channel with a bandwidth of 13.5 MHz and two half-bandwidth chroma channels each with a bandwidth of 6.25 MHz onto one 270 Mbit serial data stream—described as a 4:2:2 video signal. Occasionally it is desirable to transmit a full bandwidth video signal—one with 13.5 MHz bandwidth in each of the luminance and two chroma channels. This is referred to as the 4:4:4 format. In the serial domain SMPTE-174 describes a method of transmitting this wide bandwidth signal in one serial data stream. This is commonly called "Single Link." The disadvantage of this method is that the serial data doubles to 540 Mbit. This is more difficult to implement and has little support from component manufacturers.

SMPTE-175 describes a method of combining the wide bandwidth signal into two serial data streams. This is commonly called "Dual Link." This maintains the standard 270 Mbit data rate but doubles the number of components required, as two data streams must be provided.

What is desired is a method of transmitting a full bandwidth chroma signal using the standard 270 Mbit channel.

BRIEF SUMMARY OF THE INVENTION

Accordingly the present invention provides a method of transmission of wideband chroma signals over a standard 270 Mbit serial digital channel. A video signal having a luminance component and two half-bandwidth chrominance components is converted into two wide bandwidth chrominance components by dropping the luminance component and converting the half-bandwidth chrominance components to wide bandwidth chrominance components. A multiplexer, having the wide bandwidth chrominance components as inputs, outputs half of the wide bandwidth chrominance component samples in place of the luminance component and the other half of the wide bandwidth chrominance component samples in place of the two half-bandwidth chrominance components in a standard 4:2:2 video format to produce a full bandwidth chrominance component 0:4:4 format. The 0:4:4 format is passed by standard 4:2:2 components and then demultiplexed at a receiver to recover the wide bandwidth chrominance components.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is an illustrative view of typical standard 4:2:2 formats according to the prior art.

DETAILED DESCRIPTION OF THE INVENTION

To transmit a full bandwidth chroma signal, luminance is not required and both chroma signals have a 13.5 MHz bandwidth. This is described as a 0:4:4 video signal. Rather than require a nonstandard 540 Mbit data path or two standard 270 Mbit data paths to transmit this signal, the two wide bandwidth chroma channels are packed into the space normally occupied by the standard 4:2:2 video signal. There are many formats for packing the two chroma channels in the data path. The only requirement is that the demultiplexer (receiver) operates with the same packing rules as the multiplexer (sender). The packing format chosen for the present embodiment has the advantage that the data stream may be monitored (with reduced resolution) with some standard 4:2:2 transmission equipment.

Figure 2:
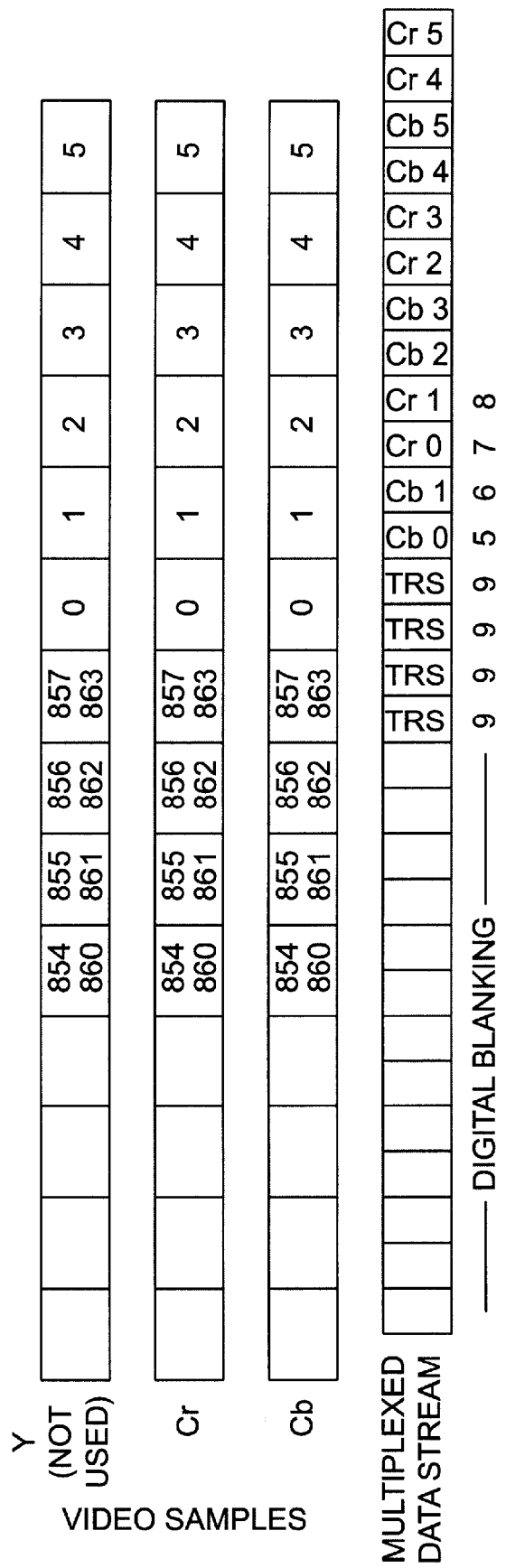
FIG. 2 is an illustrative view of the 0:4:4 wide bandwidth chrominance component format according to the present invention.

As shown in FIG. 1 the 4:2:2 format places the two chroma samples at locations 1 and 3 in the data stream. The luminance channel samples are placed at locations 2 and 4. Now referring to FIG. 2 the wide bandwidth chroma format places half of the chroma samples at the same relative positions in the data stream (positions 5 and 7). This similarity maintains compatibility with some standard monitoring equipment. The additional chroma samples are placed at locations 6 and 8, previously occupied by the luminance samples. As before, this sequence is repeated throughout the video scan line.

Figure 3:
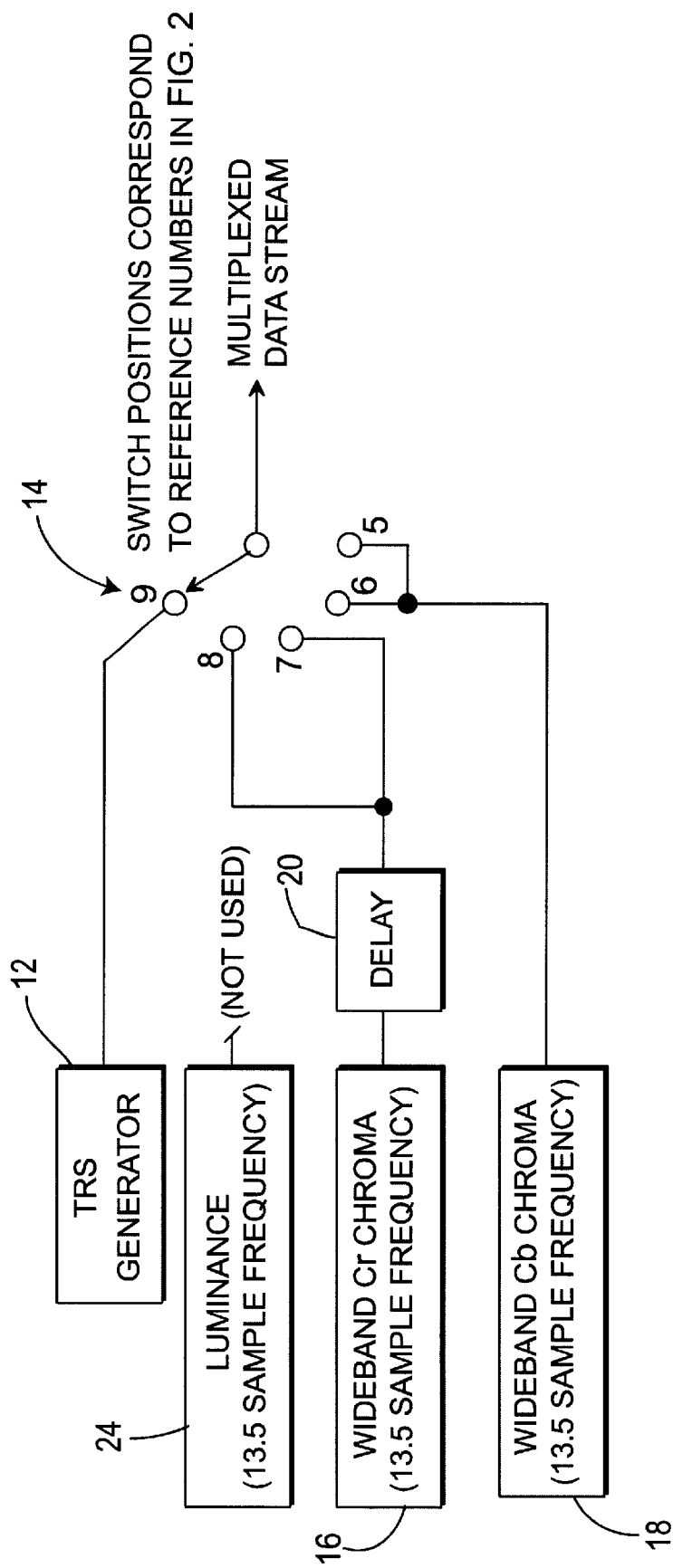
FIG. 3 is a block diagram view of an illustrative multiplexer for producing the 0:4:4 format according to the present invention.

The block diagram of FIG. 3 illustrates one method of implementing the multiplexer to produce the wideband chroma data stream. A TRS generator 12 is coupled to one pole 9 of a five pole switch 14. One wideband chroma source 16 is coupled directly to poles 5, 6 of the switch 14, while the other wideband chroma source 18 is coupled to poles 7, 8 of the switch through a delay element 20. The switch 14 pole positions 5, 6, 7, 8, 9 correspond to the sample reference numbers in FIG. 2. The luminance component from a luminance source 24 is not applied to the switch 14, i.e., it is dropped from the data stream output from the switch. Serializers, reclockers, deserializers, etc. designed for the standard SMPTE RP-259 transmission format conduct this 0:4:4 channel transparently.

Thus the present invention provides a method of transmission of wide bandwidth chroma signals by dropping the luminance component and placing one-half of the wide bandwidth chroma samples in place of the luminance component and the other half of the wide bandwidth chroma samples in place of the two half-bandwidth chroma components in a standard serial digital data stream.

What is claimed is:

1. A method of transmission of wide bandwidth chroma signals comprising the steps of:
   dropping the luminance component from a component video signal having a luminance component and two half-bandwidth chrominance components;
   converting the half-bandwidth chrominance components to wideband chrominance components;
   inserting half of the wideband chrominance components into a standard serial digital video data stream in place of the luminance component; and
   inserting the other half of the wideband chrominance components into the standard serial digital video data stream in place of two half-bandwidth chrominance components to produce a 0:4:4 video signal format compatible with equipment for processing a 4:2:2 video signal format.

* * * * *